United States Patent [19]
Curchod

[11] 3,826,299
[45] July 30, 1974

[54] TYRE CHANGERS

[76] Inventor: Donald Butler Curchod, 150 Cabarita Rd., Clareville, New South Wales, Australia 2107

[22] Filed: Sept. 8, 1972

[21] Appl. No.: 287,351

[52] U.S. Cl............................ 157/1.24, 157/1.17
[51] Int. Cl............................................ B60c 25/10
[58] Field of Search.......... 157/1.1, 1.17, 1.2, 1.22, 157/1.24, 1.26, 1.28

[56] References Cited
UNITED STATES PATENTS
2,772,726  12/1956  Mercaldo............................ 157/1.24
3,717,193  2/1973  Craft.................................. 157/1.24 X Primary Examiner—Al Lawrence Smith
Assistant Examiner—Harold P. Smith, Jr.
Attorney, Agent, or Firm—Brisebois & Kruger

[57] ABSTRACT

A tyre changer and bead breaker having a cylinder actuated threaded shaft which when displaced urges a bead breaker holder against a tyre on a wheel positioned in the path of travel of the bead breaker to separate the bead from the rim, the tyre thereafter being positioned coaxially with respect to the shaft, and a tyre lever which when mounted on the shaft, is rotated upon displacement of the shaft whereby portion of the lever inserted between the wheel and the tyre removes the tyre from the wheel.

8 Claims, 11 Drawing Figures

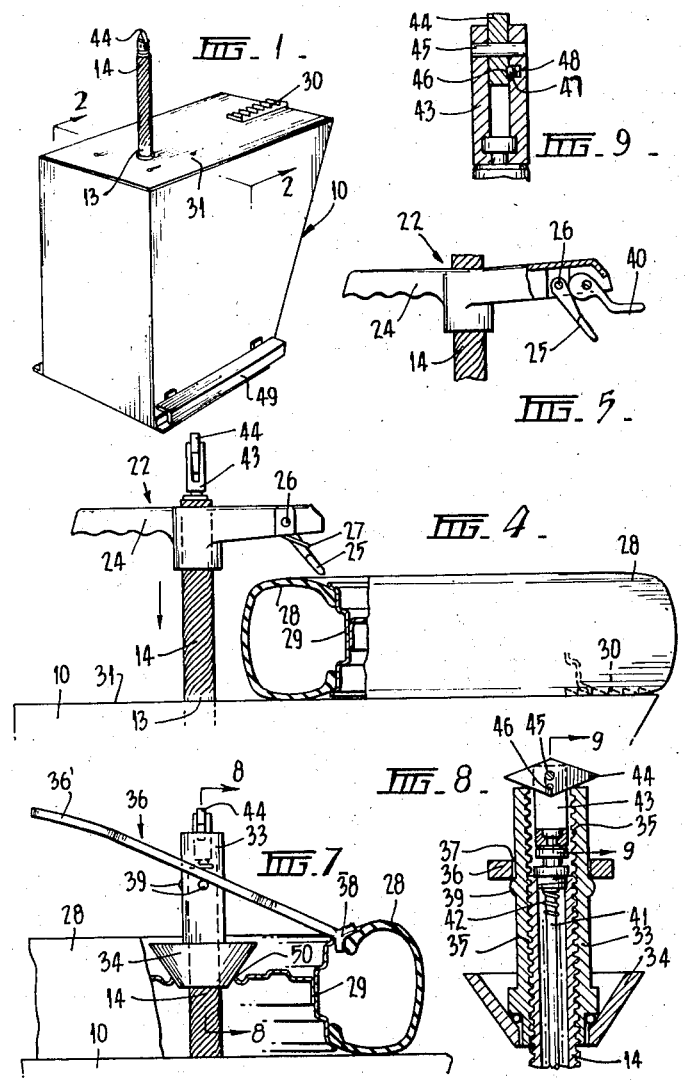

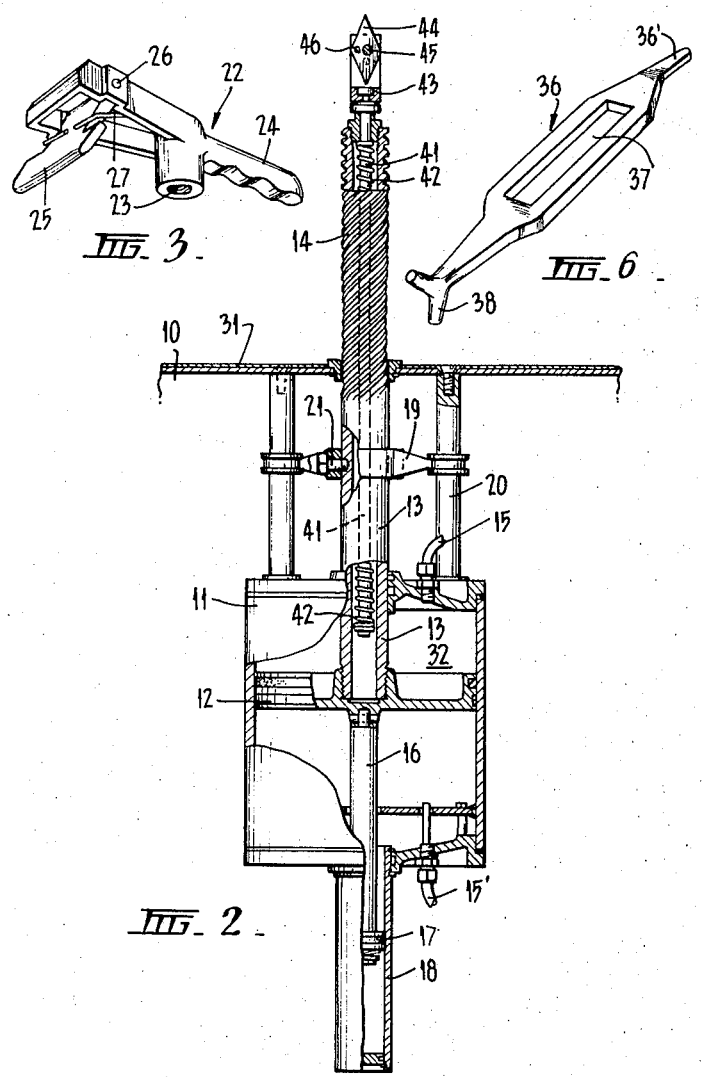

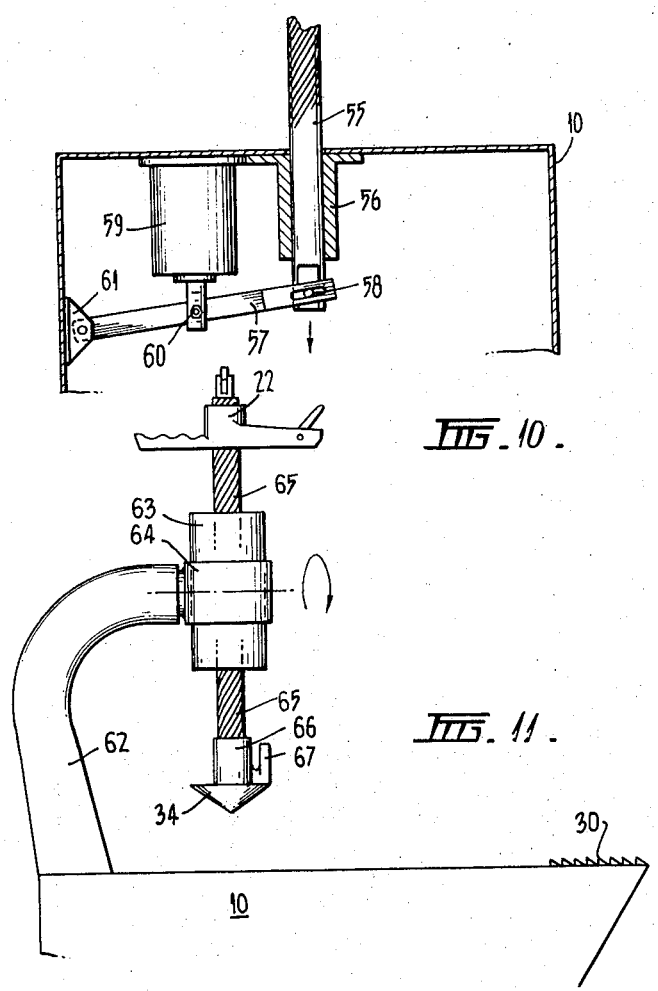

TYRE CHANGERS

BACKGROUND OF THE INVENTION

This invention relates to tyre changers and in particular to a tyre changer which has the dual function of tyre changer and bead breaker in the one machine.

SUMMARY OF THE INVENTION

In a preferred form of the present invention the tyre changer includes a working cylinder having a shaft on which a variety of tools may be mounted to carry out the bead breaking and tyre changing functions.

The tyre changer of the present invention comprises a base, a working cylinder mounted thereon, a shaft connected to a piston in the cylinder and arranged for reciprocating movement with respect to the base, the shaft having a threaded end for mounting thereon a bead breaking tool in adjustable relationship to a tyre and wheel combination mounted on the base, fluid means to reciprocate said shaft, said shaft when moved towards the base causing said bead breaker to contact the tyre to displace the bead from the wheel rim, a nut and cone member for mounting on a threaded part of the shaft, said nut member having a surface which engages the wheel rim and a driving surface for engagement with a slotted lever member on the outside and threads on the inside for engaging the threaded end of said shaft, said lever member having a part on one end which locates between the displaced bead of the tyre and the wheel rim when the wheel is mounted over said shaft whereby displacement of the shaft towards the cylinder causes rotation of the wheel nut and lever to lift the bead of the tyre away from the wheel rim.

The lever member may incorporate on its other end a forked portion, one part of the fork portion engaging under the bead to force it under the wheel rim when the wheel nut is rotated as defined in the preceding paragraph.

DESCRIPTION OF THE DRAWINGS

FIG. 1 is an isometric view of the tyre changer of this invention,

FIG. 2 is an enlarged sectional view along the line 2—2,

FIG. 3 is an isometric view of one form of bead breaker,

FIG. 4 is a side elevation of the bead breaking operation,

FIG. 5 is a partly sectioned side elevation of a modified bead breaker,

FIG. 6 is an isometric view of one form of tyre lever,

FIG. 7 is a partly sectioned view showing the operation of the tyre lever,

FIG. 8 is a cross sectional view of the nut and cone member,

FIG. 9 is a cross sectional view of the clamp member on top of the shaft,

FIG. 10 is a cross sectional view of a modified cylinder arrangement, and

FIG. 11 is a side elevation of another modified cylinder arrangement for the tyre changer of FIG. 1.

DESCRIPTION OF THE PREFERRED EMBODIMENTS

The metal cabinet 10 houses an air or hydraulic cylinder 11 and the piston 12 therein has a shaft 13 extending therefrom having at its distal and upper end a coarse threaded section 14.

Air inlets 15 and 15' are provided in the cylinder above and below the piston 12 and this has an extension rod 16 on its lower end with a dash pot piston 17 sliding in an auxiliary cylinder 18. A cross guide 19 slides on columns 20 supporting the cylinder 11 below the cabinet 10 and a set screw 21 in the cross guides prevents any rotation of the shaft 13.

A bead breaker 22 is arranged for mounting on the threaded section 14 and it includes a threaded bore 23 a hand grip 24, a tool piece 25 which is pivoted at 26 to the bead breaker and retained in position by a biassing spring 27 so that its free end locates on a tyre 28 mounted on a wheel 29. The wheel engages a tyre stop 30 in the form of a saw-tooth wedge secured to the upper surface 31 of the cabinet 10.

When the cylinder 11 is operated by admitting working fluid to the space 32 above the piston the shaft 13 is pulled downwards and the bead breaker holder 22 is pulled towards the tyre 28. The bead breaker holder 22 is threaded or otherwise machined to fit on the shaft 14 and does not rotate when it is hard against the tyre 28. After the bead is broken the bead is freed from the rim either manually or by rotating the tyre 28 to a new position. The tyre 28 is then turned over and the operation repeated on the other side.

The bead breaker arm is removed and the wheel is then fitted over the shaft 13 and a nut 33 and cone 34 fitted. The nut 33 is square in section and rotates freely with respect to the cone 34 to which it is secured and is internally threaded at 35. It receives a tyre lever 36 having an elongated matching slot 37 which has an offset portion 36' on one end and a forked portion 38 at the other end and is arranged in relation to the tyre depending on whether the tyre is to be removed or replaced, the latter being used in the tyre replacing operation. Locating balls 39 are positioned on the nut 33 to position the tyre lever 36.

In FIG. 5 the bead breaker holder 22 incorporates a pivoted lever 25 which breaks the bead and which is maintained in a selected position by means of a cam lever 40. The latter by its profile limits the distance of the free end of lever 25 from the shaft 13 so as to locate this free end under the rim of wheels 29 in which the tyre 28 bulges sharply away from the rim.

In FIG. 8 the shaft 13 is hollow and supports a locating rod 41 which is spring biassed by a spring 42 into a position in which it is urged towards the cylinder 11. The rod 41 carries a bracket 43 having a pivoted diamond shaped wheel clamp member 44, pivoted at 45 with a dimple or hole 46 into which a plunger 47 backed by a spring 48 locates. The diamond shaped wheel clamp member 44 can thus be rotated in a position in which it will either retain the nut 33 in position or in which it will allow it to be removed.

The valves controlling the admission and exhaust of air from the pipes 15, 15' are operated by a flap member 49.

The cone member 34 is dimensioned so that it locates in the aperture 50 of a tyre to locate it in position about the threaded shaft 14.

In the construction shown in FIG. 10 the shaft 55 slides in a bush 56 and is actuated by a lever 57 engaging a pin 58 on the lower end of the lever. A cylinder 59 has a pivotal connection 60 to the lever 57 and the latter is pivotally connected to a bracket 61 on the cabinet 10. This type of arrangement permits the overall height of the unit to be reduced.

Some vehicle wheels do not have the central mounting hole and the construction of FIG. 11 provides means for dealing with this type of wheel. An upstanding arm 62 extends from the frame 10 and the cylinder 63 is mounted on the arm by means of a yoke 64 which is rotatable to either a bead breaking or tyre removing position. In the drawing the cylinder is arranged with the cone member 34 in position on one end of the threaded shaft 65. It has a bush 66 and driving key 67. The other end of the shaft 65 carries the bead breaker holder 22.

I claim:

1. A tyre changer including a base, a working cylinder mounted thereon, a shaft connected to a piston in the cylinder and arranged for reciprocating movement with respect to the base, the shaft having a threaded end for mounting thereon a bead breaking tool in adjustable relationship to a tyre and wheel combination mounted on the base, fluid means to reciprocate said shaft, said shaft when moved towards the base causing said bead breaker to contact the tyre to displace the bead from the wheel rim, a slotted lever member, a nut member for mounting on said threaded end of the shaft, said nut member having on its outside a driving surface for engagement with the slot in said slotted lever member and internal threads for engaging the threaded end of said shaft, said lever member being so dimensioned that one end thereof locates between the displaced bead of the tyre and the wheel rim and said nut member having a surface which engages the wheel rim when said wheel is mounted over said shaft, whereby displacement of the shaft toward the cylinder causes rotation of the nut and lever to lift the bead of the tyre away from the wheel rim.

2. A tyre changer as claimed in claim 1 in which the lever member incorporates on its other end a forked portion one part of the fork portion being adapted to engage under the bead to force it under the wheel rim during mounting of the tire when the wheel nut is rotated by displacement of the shaft towards the cylinder.

3. A tyre changer as claimed in claim 1 in which the bead breaker incorporates first and second pivoted levers, the second lever having a cam surface thereon which contacts the first lever to displace its free end to a position where it engages the tyre adjacent the wheel rim and allows the distance between the free end of the first pivoted lever and the shaft to increase as the latter is pulled towards the cylinder.

4. A tyre changer as claimed in claim 1 in which the nut member includes a conical bearing portion which engages in an aperture in the wheel rim to retain it in position whereby the shaft as it is pulled down towards the cylinder causes the cone to clamp the wheel down and the engaging thread forces the nut and bar to rotate, the torque of rotation being transmitted to the frame.

5. A tyre changer as claimed in claim 1 in which the cylinder is mounted to one side of the shaft and operates the shaft through a lever member.

6. A tyre changer as claimed in claim 1 in which the cylinder is mounted above the base and the shaft extends from the piston towards said base.

7. A tyre changer as claimed in claim 1 in which the cylinder is mounted above the base and is provided with a shaft extending from each end thereof, the bead breaking tool being mounted on one end of the shaft and the nut member mounted on the other end of the shaft, said cylinder being rotatable on an arm extending up from said base whereby either the nut member or bead breaking tool may be positioned adjacent the base.

8. A tyre changer as claimed in claim 1 in which the nut member includes a cone which is rotatable with respect to but axially movable with the remainder of said nut, and which engages in an aperture in the wheel rim to retain said rim in position, whereby the shaft, when pulled down toward the cylinder, causes the cone to clamp the wheel down and the engaging threads force the remainder of said nut and said lever to rotate.

* * * * *